(12) United States Patent
Hogan

(10) Patent No.: US 6,267,671 B1
(45) Date of Patent: Jul. 31, 2001

(54) GAME TABLE PLAYER COMP RATING SYSTEM AND METHOD THEREFOR

(75) Inventor: Nicholas Kurt Hogan, Henderson, NV (US)

(73) Assignee: Mikohn Gaming Corporation, Las Vegas, NV (US)

(*) Notice: Subject to any disclaimer, the term of this patent is extended or adjusted under 35 U.S.C. 154(b) by 0 days.

(21) Appl. No.: 09/249,453

(22) Filed: Feb. 12, 1999

(51) Int. Cl.$^7$ ........................................ A63F 9/24
(52) U.S. Cl. .................. 463/25; 463/42; 463/29
(58) Field of Search ............................ 463/25, 29, 40–42

(56) References Cited

U.S. PATENT DOCUMENTS

| | | |
|---|---|---|
| 4,531,187 | 7/1985 | Uhland . |
| 4,614,342 | 9/1986 | Takashima . |
| 5,078,405 | 1/1992 | Jones et al. . |
| 5,374,061 | 12/1994 | Albrecht . |
| 5,472,194 | 12/1995 | Breeding et al. . |
| 5,586,936 | 12/1996 | Bennett et al. . |
| 5,613,912 | 3/1997 | Slater . |
| 5,651,548 | 7/1997 | French et al. . |
| 5,655,961 * | 8/1997 | Acres ..................................... 463/27 |
| 5,673,503 | 10/1997 | Rendleman . |
| 5,735,742 * | 4/1998 | French ................................. 463/25 |

(List continued on next page.)

FOREIGN PATENT DOCUMENTS

| | | |
|---|---|---|
| WO 97/10577 | 3/1997 | (WO) . |
| WO 97/13227 | 4/1997 | (WO) . |
| WO 97/13424 | 4/1997 | (WO) . |
| WO 97/30414 | 8/1997 | (WO) . |
| WO 97/38366 | 10/1997 | (WO) . |
| WO 97/44750 | 11/1997 | (WO) . |
| WO 98/02811 | 1/1998 | (WO) . |

OTHER PUBLICATIONS

Lodging and Gaming Systems, Player's Club, Internet Advertising, Jan. 21, 1999 (2 pages).
Lodging and Gaming Systems, Player Tracking, Internet Advertising, Jan. 21, 1999 (2 pages).
Lodging and Gaming Systems, Pit Marker Tracking, Internet Advertising, Jan. 21, 1999, (2 pages).
Casino Data Systems, Systems & Services, Internet Advertising, Jan. 21, 1999, (2 pages).
Casino Data Systems, ProTURBO™, Internet Advertising, Jan. 21, 1999, (2 pages).
Bally Gaming, A System For Success, Internet Advertising, Jan. 25, 1999, (2 pages).
International Game Technology, Gaming Technology, Gaming Systems, Advertising, (14 pages).
Bourgogne et Grasset, Internet Advertising, Jan. 8, 1999, (2 pages).

(List continued on next page.)

Primary Examiner—Benjamin H. Layno
(74) Attorney, Agent, or Firm—Dorr, Carson, Sloan & Birney, P.C.

(57) ABSTRACT

An automated comp rating system and method for accurately determining a players gross wagers at a live card game table. A reader at each player position at a game table reads a player data medium to identify a player. The player places a wager wherein each wagering device has value identifying data. A decoder receives the value identifying data to automatically determine the value of each wager. A computer obtains the player's identity, the wager value, and the player position and the time of each live card game. The computer determines a gross session wager value for the each gaming session constituting a number of separate live card games at the table. Any computer in the system can access the game table computer and a database containing a player's history record to determine an accumulative gross wager, a premium point factor, the premium point balance, for awarding comps, paying agent fees to player scouts, tailoring a direct mail campaign, and reducing labor costs.

22 Claims, 7 Drawing Sheets

U.S. PATENT DOCUMENTS

| | | | |
|---|---|---|---|
| 5,761,647 | * | 6/1998 | Boushy .................................... 463/25 |
| 5,770,533 | * | 6/1998 | Franchi .................................... 463/42 |
| 5,809,482 | | 9/1998 | Strisower . |

OTHER PUBLICATIONS

Phillips, Contactless Identification Products, Internet Advertising, Jan. 8, 1999, (4 pages).

SafeJack™ Brochure, Mikohn (10 pages).

Grips Brochure, Table Data Information System (2 pages).

PRC Gaming Systems, PitTrack™, Dec. 10, 1996, (5 pages).

Grips, Golden Eye Pit Tracking Brochure (4 pages).

Grips, Golden Eye Pit Tracking, (8 pages).

The Technology Track, Barry Rosenberg, Publishing in International Gaming and Wagering Business, Oct. 1997 (5 pages).

* cited by examiner

Bill Smith (#01-505-11-9081) ← 814

Trip: { 02/05/98 – 02/12/98 ← 817
816 ↗ { 04/10/98 – 04/12/98

Session: { 1. Blackjack 04/10/98, 13:21 p.m.
         { 2. Baccarat 04/10/98, 15:33 p.m. ← 822
818 ↗    { .
         { .
         { N

810

PLAYER LIFE SUMMARY: ← 840

Trips [2]  Hands [9820]  Handle [245,500]
BuyIns [115,000]  Avg. Bet [25]
PPP [88.75]  Comps [525]
                        ↖ 841

TRIP SUMMARY: ← 850

Trip # [2]  Hands [1500]  Handle [52,580]
BuyIns [15,000]  Avg. Bet [35]
PPP [88.75]  Comps [125]
                         ↖ 851

SESSION SUMMARY: ← 860

Start [ ]  Hands [10]  Handle [235]
End   [ ]
BuyIns [100]  Avg. Bet [23.50]
PPP [98.00]  Comps [25]
                      ↖ 830

GAME TABLE PLAYER COMP RATING SYSTEM AND METHOD THEREFOR

BACKGROUND OF THE INVENTION

1. Field of the Invention

The present invention relates to rating gaming players as to wagers placed at live card games and, more particularly, to automatically rating players at live card game tables for the issuance of comps.

2. Statement of the Problem

In order to encourage higher gross levels of wagering by players, casino operators often extend complimentary goods and services to players in exchange for more active wagering. This is conventionally known as "comping" and the casino operators award players "comps." "Comps" can be any redeemable forms of currency and/or currency equivalent typically issued (for promotional purposes) by casinos to their players in exchange for active, table game patronage. Such "comps" include points, club points, premium points, player club points, coupons (e.g., free meals, free shows, free gifts, etc.), comp dollars and/or any other form of redeemable coupon, voucher, cash rebate, good or service.

Certain casinos offer players club cards. Players can insert the club card into a conventional slot machine and as the player plays the slot machine, "tickets" are issued based upon the gross wagers made during the time the player plays the slot machine (e.g., one ticket whenever the accumulative wager equals $50). This is only an example of one standalone comp awarding approach wherein the comp determination and the delivery of tickets are made at the slot machine. The player collects the "tickets" and uses them in exchange for goods or services such as free meals. Other conventional approaches exist in awarding comps.

Generally speaking, a player entitled to "comps" identifies himself/herself upon initiation of a gambling session (i.e., the period during which the player participates actively in a form of gambling). The casino then determines the player's "gross session wager" (i.e., the total currency value put at stake by the player over the course of the gambling session). The casino multiplies the gross session wager by the house advantage (i.e., the percentage of total amount wagered that the casino can expect to win in accordance with the inherent statistical probability of a given game type), thus producing a theoretical expected win (i.e., the product of gross session wager multiplied by house advantage and usually expressed in units of currency). The casino then expresses the theoretical expected win as a currency value and multiplies the theoretical expected win by an internal percentage known as the comp factor (i.e., the percentage of theoretical expected win which the casino is willing to return to players in the form of complimentary goods and/or services—a typical range is fifteen to forty-five percent of theoretical expected win), thus producing available comp (i.e., the product of theoretical expected win multiplied by the comp factor which may be expressed as units of currency or point equivalents). The player then requests goods and/or services in exchange for his or her play at the gaming sessions. The casino determines the value of the goods and/or services requested and the player's available comp and provided that the available comp is sufficient, the good and/or service is delivered. The available comp is adjusted to reflect the value of the good and/or service delivered.

In conventional automated game machines such as slot machines, an accurate determination of available comp conventionally occurs. The player inserts the club card into a card reading device at the gaming machine. The processor in the game machine communicates with a remote game machine management system and updates the specific player file in a system database. The player conducts the gaming session at the gaming machine and during the gaming session, the processor updates the player file with the currency value of each game (i.e., handle pull for a slot machine). The currency values accrue within individual player files, resulting in either periodic or real-time, positive adjustments to the gross wager balance for the player. When a player requests a good and/or service, the values of gross wager and house advantage (fixed percentage in slot machines) are inserted into the theoretical expected win equation. The comp factor (configurable by the casino) is then applied to the theoretical expected win, thus resulting in available comp for the player. The system determines the value of the good and/or service requested, as well as player's available comp. Provided that the available comp is sufficient, the good and/or service is delivered to the player and the available comp balance is decremented to reflect the value of the good and/or service delivered. Typical slot management and casino management systems that operate in the manner described above are conventionally provided in the industries.

When attempting to determine available comp for live card table game players, however, casinos are dependent upon human assessments of both gross wager and house advantage. As a result, casinos approximate these variables. The player notifies casino personnel of his/her presence at the game table and presents a club card. A casino employee takes the club card and inputs it at a remote terminal, thereby updating the specific player file in the table system database. The player conducts the gaming session. A casino employee, usually a pit person, surveys the player's wagering activity periodically, making handwritten assessments of average wager on paper slips or cards. The player concludes the gaming session and leaves. Once a casino employee notices that a player has departed, the handwritten assessments of average wager are summed and divided by the number of manual assessments (e.g., $75+$50+$25/3 games=$50 per game). The casino employee updates the player file with average wager information by inputting it into the system and closes the pending gaming session for the player. The resident system establishes a gross wager by multiplying the observed average wager by session duration and a decisions per hour constant. In order to establish a surrogate measure of a player's gross wager, casinos multiply estimated average wager by both the number of hours played and a decisions per hour constant. This constant represents the casino's best guess as to the average number of decisions made by the average player over the course of an hour. Expressed mathematically, therefore, this process appears as follows: Gross Wager ($)=Average Wager ($)×Time× Decisions Constant. The aforementioned values accrue within individual player files, resulting in either periodic or real-time, positive adjustments to the gross wager balance. When determining theoretical expected win, most represent house advantage with either a "worst case" or a "middle-of-the-road" percentage. In Blackjack, for example, the house advantage against a player of exceptional skill (worst case) is approximately 0.5% whereas the house advantage over a player of poor skill may be as high as 3.0%. Although some table systems do provide for the manipulation of house advantage on an individual basis, this manipulation seldom occurs and house advantage becomes a constant in practice. The predefined comp factor is then applied to the theoretical expected win, thus resulting in available comp for the player. The resident system then determines the value of the good and/or service requested, as well as the player's available comp. Provided that the available comp is sufficient, the good and/or service is delivered and the available comp balance is adjusted to reflect the value of the good and/or service delivered.

A need exists to fully automate the player rating process at a live card gaming table in a casino to accurately rate the player and to reduce labor costs. Without question, player ratings based only on human observations are inaccurate. Supervisors can easily over-assess or under-assess a particular player's rating. Furthermore, the labor costs for the supervisors are expensive.

Systems are conventionally available to assist operators in player rating determinations. However, these systems are still dependent upon subjective assessments of time played, average wager, and house advantage. A need exists to eliminate the "subjectiveness" in these assessments.

Some systems provide more automation such as the Precision Resource Corporation product trademarked PITRAK (U.S. Pat. No. 5,613,912) and Grips Systems Inc. product trademarked GOLDEN EYE (WO 97/10577). These systems provide rail-based card reading units in order to allocate accurately the length of time the player is at the gaming table. However, these systems are still dependent upon the subjective assessment of average wager and house advantage. A need exists to completely automate this feature.

A fully automated system trademarked SAFEJACK is available from Mikohn Gaming Corporation which provides a fully accurate real-time record of a player's time, average and actual wager and the house advantage. SAFEJACK records the assignment of every card to each position so that the casino can both analyze player decisions to determine the skill level of each player and to guard against card swapping. In addition, SAFEJACK identifies winners and losers, alerting the dealer when to pay, collect, or push. However, the SAFEJACK system incorporates an automated OCR card shoe and is expensive for operators. A need exists to modify the SAFEJACK system to reduce its costs and to modify it for use in comp determination.

A need exists to reward players comps for their gaming activity at a game table based upon an accurate determination of a player's wagering activity. A need exists to deliver room, food, and other such "comps" to players of table games based upon such accurate determinations.

A common practice in the gaming industry is for a "junket agent" to arrange a trip for a group of players or for a single premium player to play live card games at a casino. The junket agent receives a percentage of the gross wagers made by the group or by the premium player during the trip. Since this is presently based upon human estimation and it directly affects the compensation to the agent, a dispute may arise as to the gross wagers. A need also exists to accurately compensate player agents in the form of agent fees based upon players (i.e., originating from such player scouts) having their wagering accurately determined at the table games.

Another common practice in the gaming industry is for a casino to do a direct mailing to players in order to entice them to make a return trip. Such direct mailings use large numbers of promotional materials which may be from the several hundred thousands to the several millions. Such mailings are expensive and often result in a low response. A need further exists to tailor a direct mail campaign to players based upon an accurate determination of their gross wagers.

Casinos employ personnel to monitor and estimate player's gross wager during a gaming session. Finally, a need exists to reduce the labor costs of the casino in operating casino table games by dropping the number of supervisors and pit clerks in the pit area servicing a plurality of table games.

Hence, an overall need exists for an automated system at a table game for accurately determining a player's wagering at the table game and to accumulate the wager for purposes of awarding comps, paying of agent's fees to player scouts, tailoring a direct mail campaign, and reducing labor costs.

SUMMARY OF THE INVENTION

1. Solution to the Problem.

The present invention solves the aforesaid need by providing an automated system which accurately determines a player's wage rate at a live card game table and accumulates the wagers for purposes of awarding comps, paying of agent fees to player scouts, tailoring a direct mail campaign, and reducing labor costs.

2. Summary.

A comp rating system and method for determining a player's gross wagers at a live card game table is presented. The game table has player positions and a dealer position. Each player position has a wager area. The comp rating system and method of the present invention provides a player data medium such as a player's card carrying data identifying the player. At each player position at the game table is a reader, preferably an in rail reader, which reads the player data medium so as to identify the player from the player data. The player places a wager with one or a plurality of wagering devices wherein each one of the plurality of wagering devices has contained within it value identifying data. These wagering devices are placed by the player in the wager area of the game table. A decoder at the game table receives the value identifying data from each of the wagering devices so as to automatically determine the value of each wager for each live card game played at the table by the player. A computer having a memory is located at the game table which obtains the player's identity, the wager value of each live card game played, and the player position as well as the time of each live card game. The computer determines a gross session wager value for the player for the time the player plays a gaming session constituting a number of separate live card games at the table. Any computer in the system can access the game table computer and a database containing a player's history record to determine an accumulative gross wager, a premium point factor, and the premium point balance, to determine whether a comp should be awarded to the player.

BRIEF DESCRIPTION OF THE DRAWINGS

FIG. 8 is a display screen illustration for an individual player showing historical gross wager information.

DETAILED DESCRIPTION OF THE INVENTION

1. Overview.

Figure 1:
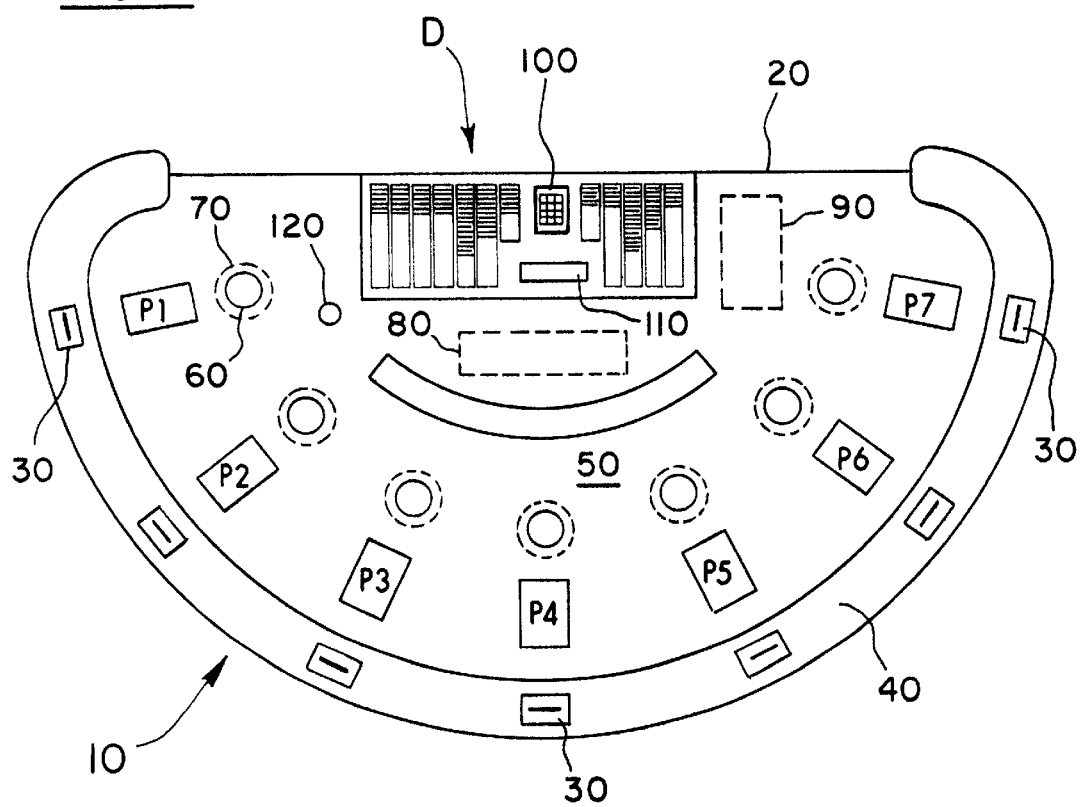
FIG. 1 is a top planar view illustrating a Blackjack live card game table incorporating the present invention.

In FIG. 1, is set forth the system 10 of the present invention for a game table 20 on which a live card game is played. The system 10 of the present invention can be applied to any of the following conventional game tables: Baccarat and variants such as Grand Baccarat, Mini Baccarat, Midi Baccarat, Chemin de fer and Puncto Banco; Blackjack and variants such as Progressive Twenty One, Triple Action Blackjack, Super Seven's Blackjack, Spanish Twenty One, Vingt et un and Pontoon; Big Wheel, Big Six and variants, Craps and variants, In Between and variants such as Red Dog and Catch-A-Wave; Poker and variants such as Caribbean Stud Poker, Caribbean Draw Poker, Let It Ride, and Wheel and Deal; Roulette and variants such as American Roulette, French Roulette, Single Zero Roulette and Twin Roulette; and Sick Bo. The form, type, and variation of the game on table 20 is immaterial to the teachings of the present invention and does not limit the teachings contained herein.

Figure 2:
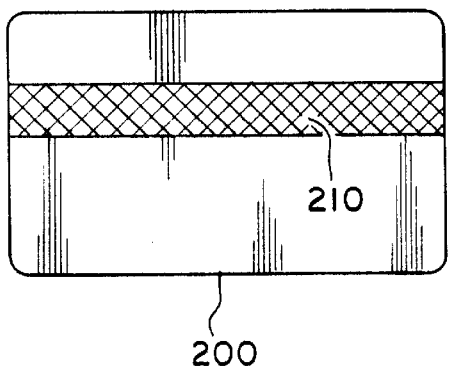
FIG. 2 is a planar view showing the magnetic strip on a prior art player card.

The game table 20, in the preferred embodiment, is adapted for Blackjack and, in FIG. 1, seven player positions P1 through P7 are shown. At each player position is a card reader 30 such as, but not limited to a magnetic card reader. The card reader 30 is shown to be located in the padded rail 40 of FIG. 1 on the game table 20, but could also be located on the surface 50 of the table 20 or any suitable location including near the gaming table 20. Any commercially available card reader 30, especially those adapted for the gaming industry, could be utilized under the teachings of the present invention. Each card reader 30 forms part of an array of card readers which are responsible for the collection of programmed data present on the card-based magnetic strip. The present invention is not limited to magnetic card readers and it is to be expressly understood that the card utilized could be a smart card and that the device 30 could write data into the smart card. Furthermore, any equivalent device 30 could be utilized under the present invention which at least reads player identification data from a data medium carried by the player. In FIG. 2 is shown a magnetic card 200 containing a magnetic strip 210 carrying player information and other data. This card, or player data medium 200, and reader 30 are used throughout to illustrate the teachings of the present invention and does not limit the teachings thereof, and other devices including a keyboard to directly key in player identification data, could also be used.

Also at each player position P1 through P7 on surface 50 is a wager area 60 on which the player places a bet, ante, or wager (termed "wager" hereinafter) according to the rules of the game.

Figure 3:
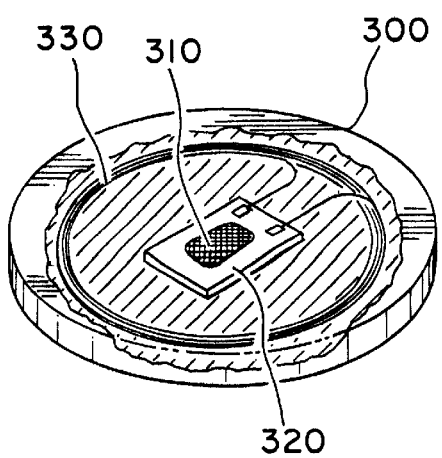
FIG. 3 is a cut-away perspective view of a prior art gaming chip having value identifying data contained therein

In FIG. 3 is shown a conventional prior art casino chip 300 which is used by a player to place the wager at area 60 in the play of the game at the game table 20. Embedded within the casino chip 300 is an application specific integrated circuit (ASIC) 310 mounted on a printed circuit board 320 and connected to a wire antenna 330. The ASIC 310 contains data pertinent to the identification and valuation of the casino chip 300. The antenna 330 (preferably copper coil) provides the electromagnetic means for communicating with a chip decoder assembly 70 located at the game table 20 (e.g., under, in, near, etc., the surface 50 of game table 20). The printed circuit board 320 coordinates the distribution of energy between the antenna 330 and the ASIC 310. The ASIC 310, the printed circuit board 320, and the antenna 330 are encapsulated in the casino chip 300 so as to be protected from physical damage and to mask their physical presence.

The chip decoder assembly 70 under each wager area 60 at each player position P1 through P7, in the preferred embodiment, comprises a photodiode to detect the presence of a wager in area 60 on the surface 50 of the game table 20 and an RF antenna to convey power (and, therefore, communicate) to the ASIC 310 in the casino chip 300. The casino chip 300 containing circuitry 310, 320, and 330 as well as the chip decoder assembly 70 are conventional, and, in the preferred embodiment, are:

HiTag Data Transponders and VEGAS HiTag RF Readers, Philips Semiconductors Gratkorn, GmbH, Mikron Weg 1, A-8101 Gratkom, Austria, and casino chips containing the transponders are from:

Bourgogne et Grasset, Z.I. Beaune-Savigny, 21200 Beaune, France.

Located typically in the center of the game table 20 and underneath the playing surface 50 is an RF reader 80 which coordinates the transfer of individual RF transmissions between the chip decoder assembly 70 and each casino chip 300. RF reader 80 is also conventionally available from Philips, supra. RF reader 80 also communicates with a game table computer 90 which is also located at the gaming table 20, preferably under the surface 50, although any suitable location near the gaming table 20 is contemplated by the present invention.

While the preferred embodiment uses the aforesaid conventional casino chips 300, decoders 70 and readers 80, it is to be expressly understood that any wagering device carrying at least value identifying data (not shown) which can be determined by a decoder 70 could be utilized under the teachings of the present invention. For example, antenna within each wager area 60 of the game table 20 uses RF transmissions to read information in circuitry resident in the casino chip 300, thus altogether eliminating the need for the photo diode arrays. The decoder determines the wager, if any, at each area 60 on the table 20.

The game table computer 90 serves as the intelligent processor and communications hub for the game table 20. The computer 90 contains software and coordinates all recognition, display, mathematical, diagnostic and communication routines and functions associated with the transfer of data between itself and the other tablebased components as will be explained in the following. The computer 90 also interfaces with computer-based systems remote from the game table 20.

In FIG. 1 is also a dealer's keypad 100 at dealer location D which serves as a communication device between the dealer and the system 10 of the present invention. It enables the dealer to enter commands and/or selections of commands from predefined menus. Also at the dealer location D is a dealer visual interface 110 which displays game information, chip tray inventories, personnel identification, casino chip 300 values, and values summed by player position P1 through P7. In addition, component status and/or miscellaneous messages from the computer 90 and/or remote computer-based systems can be displayed.

Also found on the surface 50 of the game table 20 is a start/end of round device 120 which enables the computer 90 to distinguish between individual games at the game table 20 and to trigger the initiation and conclusion of communication between the casino chips 300 and the chip decoder assembly 70 at the wagering position 60. Start/end of round device 120 can be any suitable switch such as, but not limited to, a pushbutton switch or an optical sensor activated by a card or by a hand pass from the dealer.

2. Hardware Configuration.

Figure 4:
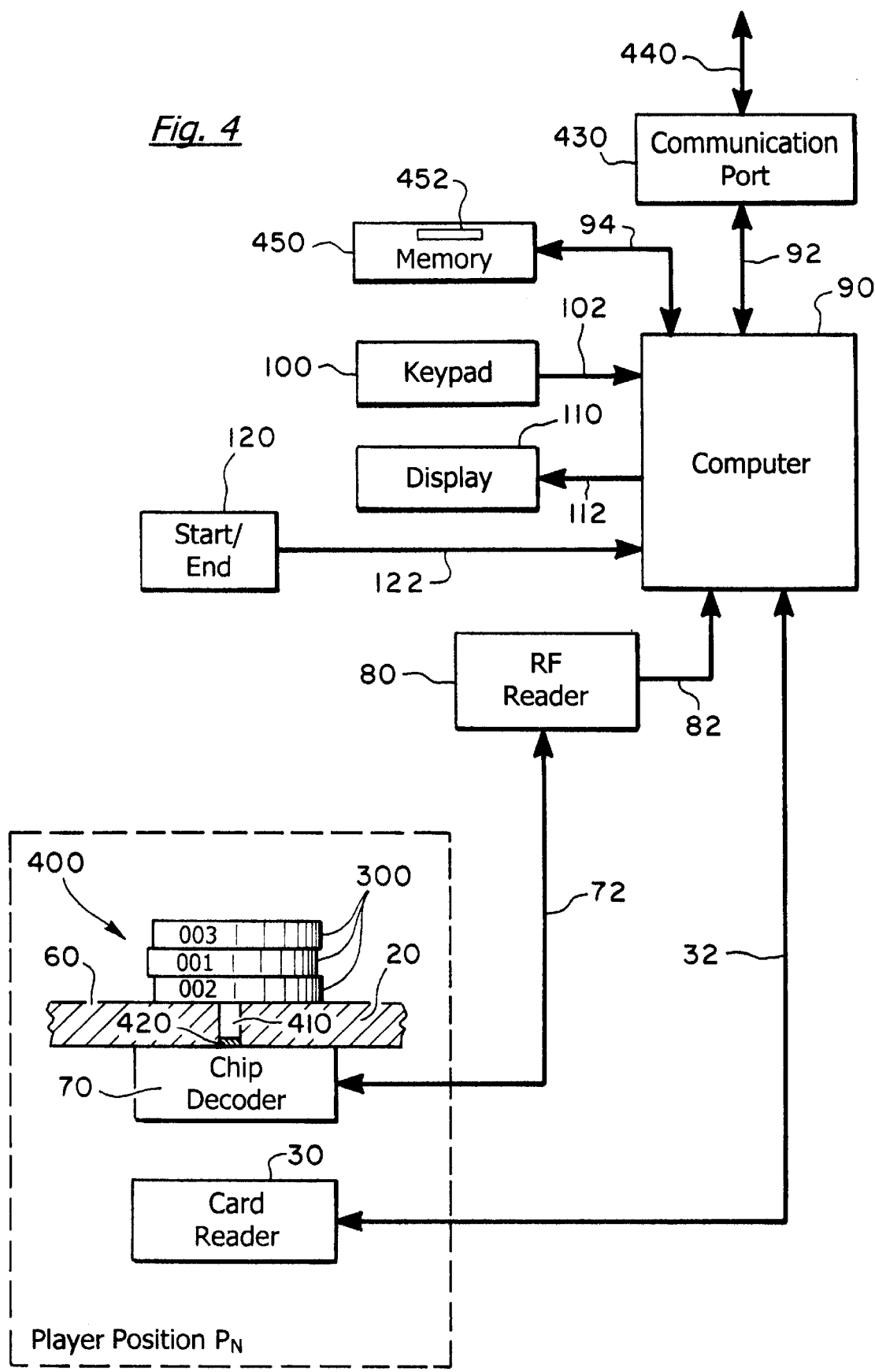
FIG. 4 is a block diagram of the electronic components at the gaming table of FIG. 1.

In FIG. 4 the interconnection of the hardware components discussed in FIGS. 1 through 3 is shown for one player position $P_N$. At player position $P_N$, is a wager 400 which typically comprises one or more chips 300 stacked in wager region 60. Stacking of the chips 300 covers an opening 410 in which is placed an optical sensor 420. In one embodiment based on SafeJack, the chip decoder assembly 70 contains the photodiode and detector circuit for sensing when a stack 400 of chips 300 is placed in wager area 60. The chip decoder assembly 70 also contains the circuitry for reading the ASIC 310 in each casino chip 300. As discussed above, the chip decoder assembly 70 can be any suitable device for use with any compatible chips that when used together automatically determine the value of the wager 400 placed in area 60. The chip decoder assembly 70 is interconnected over lines 72 to RF reader 80 which in turn is connected over lines 82 to computer 90. At player position $P_N$, is also located a card reader 30 which is connected over lines 32 to computer 90. Game table computer 90 is also interconnected to keypad 100 over lines 102, to display 110 over lines 112, and to the startlend of round device 120 over lines 122. Game table computer 90 is also interconnected over lines 92 to a communication port 430 which enables computer 90 to communicate with computer systems remote from table 20 over network lines 440.

The hardware configuration in FIG. 4 operates as follows. Computer 90 detects when a card 200 accesses card reader 30 by a player who sits at player position $P_N$. The card reader 30 reads the information (e.g., player account number and identification of player) from the magnetic strip 210 and delivers it over line 32 to the computer 90 for processing. The computer 90 determines that a player has sat at player position $P_N$ and is ready to play the next live card game at the game table 20. The player places a wager 400 at area 60 corresponding to his/her player position $P_N$. In FIG. 4, and as an illustration, the player has placed three casino chips 30 which may be of the same or of different values. The chip decoder assembly 70 detects the presence of the wager 400 placed by the player $P_N$ with photodiode 420 and delivers that information over line 72 to the RF reader 80. The chips 300 are conventionally identified (e.g., in FIG. 4 chips 300 have identities: 001, 002, and 003). The value of each chip is then read by the chip decoder assembly 70 through RF signals which are delivered into the passive transponder located in the ASIC 310 of each casino chip 300. It is to be expressly understood that the circuitry and process for identifying and for reading value information embedded in each casino chip 300 in the wager 400 with the chip decoder assembly 70 is conventional. The RF reader 80 obtains the information from each wager 400 at each player position P1 through P7 (if a wager 400 has been placed) and delivers it over lines 82 to the computer 90. The dealer starts the next game by activating start/end of round device 120 which delivers a signal over line 122 to the computer 90. The game is played. The game table computer 90 sets up a separate player table record 452 in memory 450 corresponding to each different player. This player table record 452, at least contains: the player identification data read from the player card 200 by card reader 30, the time the player inserted the card 200, the time and gross wager value of each hand played by the player, and the time the player removes the card 200 from the reader 30. Determination of real time is well known in computer science and is accomplished by computer 90. Game table computer 90 then processes the information for the game having the player's identity found on the magnetic strip 210 of the magnetic card 200 the value of the wager 400 placed in area 60 by the player and the identity of the player position.

In summary, the system 10 and method of the present invention provides casino operators with an accurate technological determination management of players ratings obtained from the following information at the game table 20:

1. Player identification number and name.
2. Player wager per session.
3. Number of player decisions per session.

The following example based upon FIG. 4 illustrates facilitating the conversion of individual chip 300 values into aggregate values by position and/or by players. Assume a player, Bill Smith, at position $P_N$ (i.e., code "ON") places his player's card 200 in card reader 30. The reader reads Bill Smith's identity code of "505-11-9081." Bill places three chips 300 in area 60. The game table 20 has an identity of "BJ-1." The chip decoder assembly 70 cycles current through its copper coil, thus resulting in the generation of an energy-conveying, electromagnetic field. Each chip 300: a) inducts current from the electromagnetic field, b) cycles the current through its copper coil 330, c) distributes the current throughout its printed circuit board 320; d) extracts serial identification from its internal memory on circuit 310 and, e) transmits the serial identification via the copper coil 330. The chip decoder assembly 70 receives the transmissions and relays them to the RF reader 80. Assume three serial IDs were received, 001, 002, and 003. The RF reader 80 instructs the chip decoder assembly 70 to address each chip 300 in numerical order, requesting the transmission of denominational value (also stored in the internal memory 450). The chip decoder assembly 70 addresses the chip 300 identified as 001 first and receives a denominational value of $5. Chips identified as 002 and 003 are addressed subsequently and the respective denominational values of $25, and $100 are received. All values are transferred to the RF reader 80 and, in turn, relayed to the computer 90. Here, the three values are summed and associated with position $P_N$ ($5+$25+$100= $130). The time and date are noted (Mar. 30, 1998, 9:00:32 am) and a record 452 for the table hand total is inserted into the system 10 database in a format similar to the following: [BJ 1\Mar. 30, 1998\9:00:32am\$130].

Multiple hand totals are summed to produce a round total. Multiple round totals are summed to produce a dealer and/or an hourly total. Multiple dealer and/or hourly totals are summed to produce a shift total. This process is repeated in order to produce totals for the day, week, month, period, quarter, annual totals and the table life. In this example, a given player and/or account number is associated with the position $P_N$, (i.e., Bill Smith/505-11-9081/ON), the record is duplicated and stored in the player's database file as a player hand total. Multiple player hand totals are summed to produce a player session total. Multiple session totals are summed to produce a player trip total. Multiple trip totals are summed to produce a player lifetime total.

The following illustrates applying a premium point factor to a handle in order to determine premium points: Bill Smith is entitled to redeemable points as a direct function of his wagering. Assume that his trip record contains fifteen individual sessions, each totaling $25,000 in gross wager. These sessions are summed, producing a trip total wager of $375,000. Assume that the house's policy awards 0.0025 premium points for each dollar wagered. The premium point factor, therefore, may be represented here as $1:0.0025. In accordance with this policy, Bill Smith possesses a 937.5 premium point balance ($375,000×0.0025 points) by the end of his trip. The system 10 of the present invention updates the player's balance on a per hand basis.

A configurable premium point factor can also be offered. That is, the casino can alter the number of premium points issued per dollar wagered in accordance with a given policy or collection of policies. If, for example, the casino wishes to offer 0.0025 points per dollar universally, it may do so. However, if it wishes to award only 0.0015 on Saturdays and Sundays, it may also do so. Similarly, factors may also be modified by game type, day of the week, time of day, promotional event, player skill, etc.

3. System Interconnection.

Figure 5:
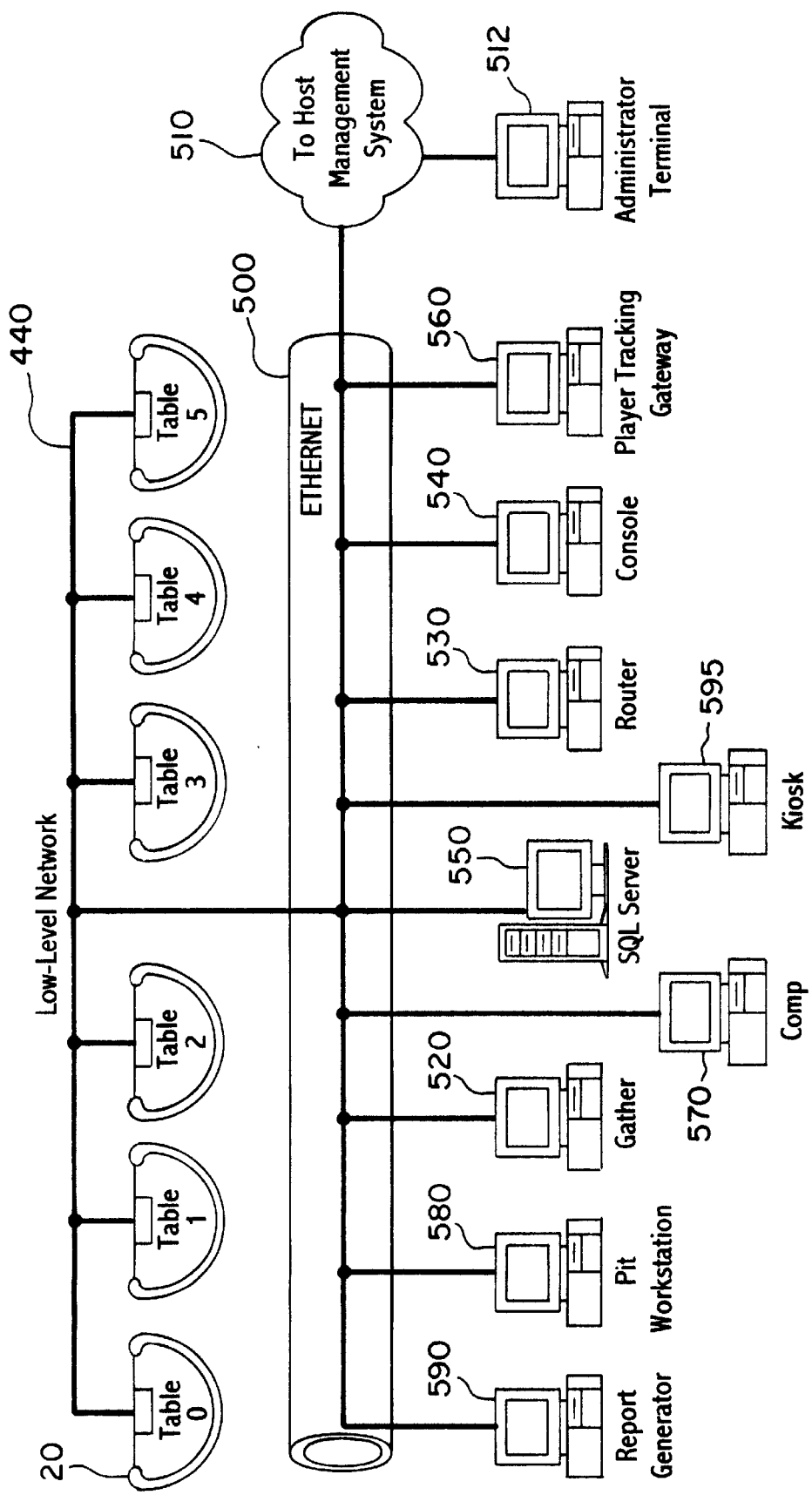
FIG. 5 sets forth a plurality of gaming tables shown in FIG. 1 connected to a networked system of computers.

In FIG. 5, each gaming table 20 can be interconnected over a low-level network 440 to an Ethernet 500. FIG. 5 shows six tables 20, however it is to be understood that any number of tables 20 could be used under the teachings of the present invention. Connected to the Ethernet 500 is gathering processor 520 which is responsible for gathering game-related information from each game table computer 90 over network 440 and for transferring the game-related information to other computers on the Ethernet 500. Computer 520 relays this information to router 530. Router 530 is the router for the Ethernet 500. The data received by the router 530 is relayed to the pit workstation 580 and to the structured query language (SQL) server 550. The pit workstation 580 is the primary interface between pit personnel responsible for the gaming tables 20 as shown in FIG. 5, and the interface with the host management system 510. The pit personnel can view individual game information at a given game table 20 and execute system 10 functions.

The SQL server 550 houses the system 10 database and, in most cases, the majority of the system 10 applications themselves. In other words, rather than being separate computers, computers 520, 530, and 580 may all be individual applications found within one computer such as the SQL server 550. Whether or not these functions are resident in individual computers or in software applications is immaterial to the teachings of the present invention and depends on design considerations. The console computer 540 ensures that all functions and processes are conducted in accordance with the rules and regulations established by the users and administrators having authority to access the system 10. The player tracking gateway computer 560 serves as an interface between the host management system 510 and the marketing database of a resident casino management system, not shown. The host management system 510 has at least one administrator terminal 512. The player-tracking gateway computer 560 enables the merge of slot and table tracking into a common database.

It is to be expressly understood that the network topology of FIG. 5 may vary considerably from casino to casino and from application to application. FIG. 5 is simply an illustration of one approach and is not meant to limit the teachings of the present invention as contained herein. The present invention accesses a player's database where a database record is centrally maintained on a player.

In the following discussion based upon the computer and network topology set forth in FIG. 5, it is to be expressly understood that any of a number of computer systems could be utilized and incorporated. In the preferred embodiment, the computer systems are personal computer-based systems having conventional input such as keyboards, mouse controls, touch screen inputs, and, of course, card readers such as card readers 30 in FIG. 1 to read player cards 200. In addition, other inputs could occur such as a dealer card, a non-dealer user card, or an administrative card as will be subsequently explained. The teachings of the system 10 of the present invention are independent of the nature and type of input device.

Furthermore, any of a number of conventional output devices could also be utlized in conjunction with the computers set forth in FIG. 5. Such output devices could include card writers such as those used for writing information onto smart player cards, smart dealer cards, smart non-dealer cards, and smart administrator cards. Other output devices include conventional printers, modems, devices to write data into a suitable medium such as a diskette.

As previously mentioned, the individual computers in FIG. 5 could represent individual software applications which could exist in a single computer but, in the preferred embodiment, contemplate separate computers located at separate positions within the casino and separate computers for separate functions as described. However, the teachings of the present invention are not limited to providing separate computers either physically or functionally since software applications could perform the various functions of the system 10 described herein. Furthermore, the interconnections between the various computers or computing applications shown in FIG. 5 could comprise any of a number of different arrangements and it is to be expressly understood that internet or intranet connections could be utilized for systems 10 involving different casinos located in different geographic positions all interconnected to a central host system which would of necessity incorporate standard telecommunication interconnections, a description of which is beyond the scope of the present application.

In the following functional flow charts based upon the system 10 of FIG. 5 and the accurate determination of gross wagering is set forth in FIGS. 1 through 4, the various data storage records discussed are conventionally stored in memory in the computing devices of FIG. 5. The storage of such records database memory structures is well known and a number of conventional database software management packages are available such as the trademarked SEQUEL SERVER 6.0 from Microsoft Corporation.

In addition, in the following function flow chart and screen discussions, a wide variety of screen display formats could be utilized with or without drop-down windows or other windowing techniques. It is to be expressly understood that the creation of such data fields and windowing techniques are well known and conventional in the art and are beyond the scope of the teachings of the present invention.

Finally, in the following functional discussion of the operation of the present invention, examples are utilized to illustrate the operation of the present invention. The use of such examples is not meant to limit the scope of the present invention and it is to be expressly understood that the various data fields defined herein, which carry data examples, may well be combined with other data fields in the operation of the casino. The data fields discussed with respect to FIGS. 6 through 10 are important to the teachings of the present invention, but their position, name, and appearance substantially vary from application to application and from design preference to design preference. What is important in the following functional presentation is the accurate determination by the system 10 of the present invention and the use of this accurately determined gross wager information by a casino in the operation of the casino's business.

4. Player Rating Process.

Figure 6:
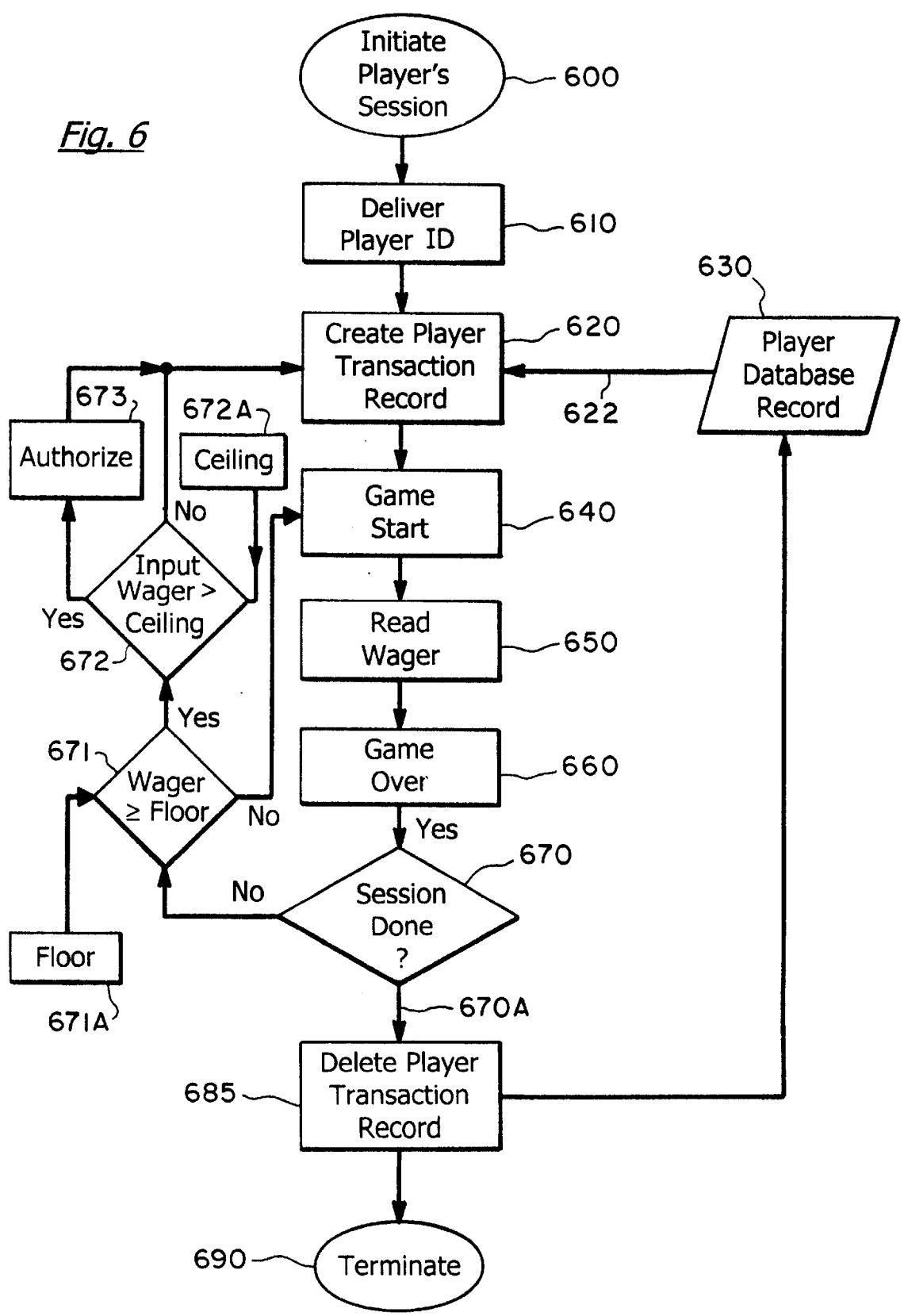
FIG. 6 is a functional flow chart for the table operation of the present invention.

In FIG. 6 the details of rating a player to determine the availability of "comps" is accomplished. In FIG. 6 and with reference to FIG. 1, a player sits at gaming table 20 at a player position P1–P7 and initiates the player session by inserting the magnetic card 200 into the magnetic card reader 30. This occurs in stage 600 which is performed by programming in computer 90. The present invention is not to be limited by the preferred initiation approach. A player's gambling session may be initiated via any of the following approaches: (a) insertion and/or placement of the player's card 200 into, atop, or in the vicinity of a game table-based data collection unit; (b) registration of player and/or session by a third party such as the dealer; and (c) automatic initiation based upon predefined characteristics of wagering, strategy, buy-in, marker activity and/or other forms of behavior. This approach provides non-dealing users with visual representation of player session activity. One feature of this approach is its ability to initiate player rating sessions based solely upon the fulfillment of given wagering criteria (neither card-entry nor manual activation is required.) Users simply enter wagering criteria (i.e., "if +5 consecutive hands at +$500) and provided that the criteria are fulfilled, a rating session is activated automatically.

As mentioned, in the preferred embodiment shown in FIG. 1 this occurs by the magnetic card reader 30 reading an inserted player's card 200. In stage 600, the card reader 30 delivers the information read from the magnetic strip 210 over line 32 to the computer 90. The computer 90 establishes a player transaction record 452 in memory 450 for the player identified in stage 620. The computer 90 then accesses through the communication port 430 the player database record 630, containing a history of the player, such as the player's comp history. In stage 620, information from the player database record 630 is inserted into the player's transaction record 452 established in memory 450 so that the computer 90 has resident at the game table 20 the necessary player information. The player's database record may also be delivered to the pit workstation 580. It is to be understood that the accessing 622 of the players record in the player database record 630 is one approach under the teachings contained herein. Under another approach, the computer 90 does not obtain the player database record 630 and only maintains the record 452 for the duration of the gaming session.

At the game table 20 level, the only information from the player database record 630 needed is a player's identification. This provides the table processor with assurance that there is an associated player file within the player database. At the pit workstation terminal 580 level, the player information includes anything from general demographic data, comp history, and historical wagering data by life, trip and/or current session.

If a smart card is used, the player database record 630 may actually be stored in a memory located within the smart card and accessed by the processor 90. In such approaches, however, there is generally some sort of data replication mechanism and an affiliated database present in the system 10 shown in FIG. 5. This is a redundancy feature which provides the host 510 with a data backup. Smart cards are becoming popular as they circumvent the need for expensive database management utilities.

The dealer activates start/end of round device 120 in FIG. 1 to start the game which is sensed by game table computer 90 in stage 640. Prior to activating start/end of round device 120, the RF reader 80 continuously polls each chip decoder assembly 70 and each location P1–P7. When startlend of round device 120 is activated, the wager 400 values at each wager location 60 are captured and delivered to computer 90 in stage 650.

In order to prompt the system 10 to initiate and to stop a given RF polling cycle, it must be provided with an indication of a given game round's starting and ending points which is generated by start/end of round button 120 as shown in FIG. 1.

Secondary wagers (i.e., doubling and splitting by players) pose particular difficulty as far as start/end of round indication is concerned. Once a polling cycle has been initiated (upon the depression of the start/end of round button/sensor 120) the accumulation of values continues until interrupted by a subsequent event. This means that the values of secondary wagers will be accumulated prior to the end of the given round. For example, at the beginning of a round, a player wagers $50. He is then dealt a pair of eight's in a Blackjack game. He splits these cards and wagers an additional $50. The system 10 detects the secondary wager. By the end of the round, the system 10 has associated $100 worth of wagering activity with this player. As far as his rating is concerned, however, the secondary wager can be either disregarded by the system 10 or used as part of the comp determination.

Thus, as far as the rating process is concerned, under one embodiment secondary wagers are not attributed to the player handle. Stated otherwise, the player handle is defined as the sum of all "original wagers" only. In order to provide operators with the classical computation of the player handle, it will therefore prove necessary, under this embodiment, to delete portions of values from certain wager captures.

In order to do so, the system 10 determines that a secondary wager has been placed. This is accomplished, as it is with the standard SafeJack product, via the incorporation of photodiode arrays 410 and 420 in area 60. Original chip wagers, from the bottom-up perspective through holes 410, appear as nothing more than a single shaded disk. In accordance with the system's 10 existing logic, the presence of two or more additional shaded disks indicates that additional wagers have been placed.

Likewise, the system 10 can also determine that a secondary wager has been placed in wager area 60 by constant wave RF polling. In other words, the chip decoder assembly 70 remains in a constant polling state (i.e., the chip decoder assembly 70 continuously generates an energy-conveying, electromagnetic field). When additional chips 300 are placed in wager area 60, additional signals are detected, thus serving as a triggering event to the system 10 that a secondary wager has been placed.

Where photodiodes 420 detect two or more chips 300, there must be a post round calculation to adjust the total value of the wager captured. In Blackjack, secondary wagers must be directly proportionate in gross value to original wagers in all cases but insurance, insurance for less and double for less. Insurance wagers, as they are placed outside of the betting box, are of no concern. Double for less wagers, although not directly proportionate to original wagers, comprise merely a fraction of one percent of the overall number of wagers placed. Therefore, as a standard principle, the value of the total wager recorded should be reduced by one-half. However, any suitable algorithm can be implemented to determine the value of the secondary wager.

Alternatively, the system 10 only detects and determines values when start/end of round device 120 is activated and ignores subsequent wagers during the game.

When the game is over, the dealer again activates start/end of round device 120 and in stage 660, the computer 90 detects this and the game is over. If the player removes his or her card 200 from the card reader 30, the gambling session for the player is over and this is detected by the computer 90 in stage 670. Optionally, a wager floor 671, a wager ceiling 672, or a combination thereof may be used at this point, as discussed more fully below.

If the card 200 remains in reader 30, then the process returns to stage 620 and updates the information for the player. This update information includes the gross wager per game unit (e.g., hand) and the time of the hand. It is to be expressly understood that this function could be performed by the computer 90 during the play of the actual hand between game start 640 and game over 660. In which case, in stage 670, if the session is not over, then stage 640 would be entered for the next game. Whether stage 620 is entered or stage 640 is entered from stage 670 is a matter of design preference by the users of the system 10. At this time, the player database record 630 at the remote location can also be updated even though the game session is not over.

If the game playing session is done in stage 670, the computer 90 enters stage 685. At this point 670A, the player transaction record is updated to reflect the final wager read in stage 650 and stage 685 is entered with the deletion of the player transaction record 452 in memory 450 and the delivery of that information by computer 90 over network 440 to the player database record 630. Upon completion of stage 685, the computer 90 enters stage 690 and the gambling session for that player is over. The player record 452 for that particular player is erased in the memory 450 at the gaming table 20. All pertinent player information with respect to gross wager per game and other information is now resident in the player database record 630 which is located remote from the gaming table 20.

Figure 7:
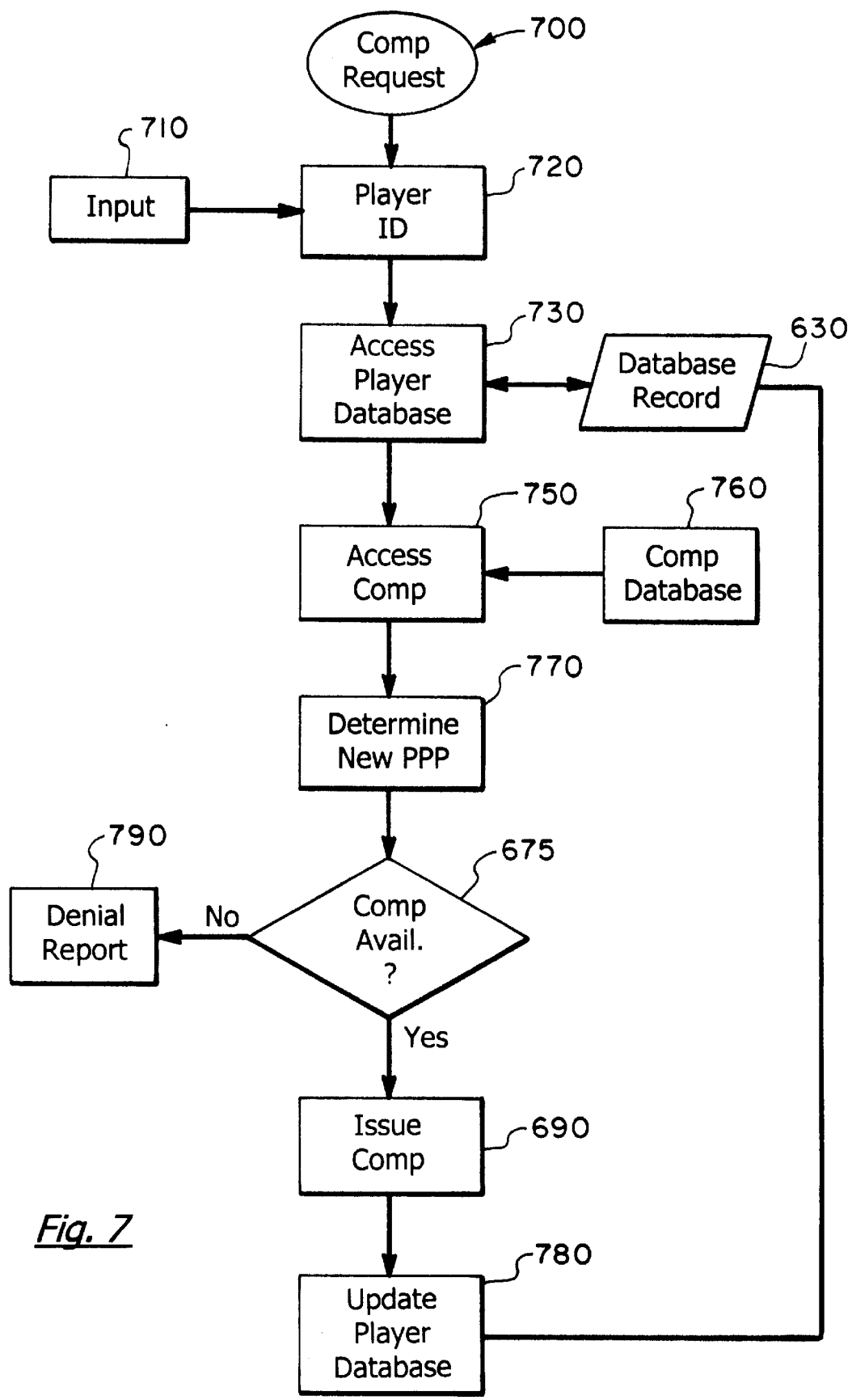
FIG. 7 is a functional flow chart for the issuance of a comp to a player.

FIG. 7 sets forth the functional flow chart for handling a player comp request. The determination of whether the player is entitled to "comps" is determined as follows:

a. Premium Point Balance (Gross Wager·Premium Point Factor)=PPP;
b. Value of Good and/or Service Requested=Comp;
c. Therefore, if [PPP≧Comp], then redemption approved;
d. Conversely, if [PPP<Comp], then redemption denied.

Furthermore, the Premium Point Balance (PPP) must be adjusted to reflect authorized redemptions. This is done as follows:

a. Opening Premium Point Balance=PPP$_{OLD}$;
b. Value of Good and/or Service Requested=Comp;
c. Closing Premium Point Balance=PPP$_{NEW}$;
d. Therefore, [PPP$_{NEW}$=PPP$_{OLD}$−Comp].

The following example is used to illustrate the functional operation of this section. Bill Smith having identification 01-505-11-9081 sits at Table No. 4 in FIG. 5, player position P3 and during game play requests a comp of two theater show tickets. The gross wager of Bill Smith at the time of request detected by the game table computer 90 at Table No. 4 is $1,600. In FIG. 5, a player makes a comp request to a user which is preferably a person in the pit area servicing the six tables shown in FIG. 5. In a preferred embodiment, the dealers do not handle such requests since to do so would interrupt game play at a given table, and instead, a non-dealer user handles the request. However, in another embodiment, the system 10 can be modified to allow dealers to handle comp requests during, after, or between play of the game. The user accesses a pit workstation 580 in stage 700 of FIG. 7. The user inputs in stage 710 the player's identity. This may occur in one of many ways. The user may know the player by name and enter the player's name in stage 710.

In our example, the name "Bill Smith" would be entered. Or, the user knows which table 20 (in the example, Table No. 4) and the position P1–P7 (in the example, P3) at the table the player is sitting at. In this situation, the user would input in stage 710 the table identification and player position. In stage 720, the player identification information stored in computer 90 for that identified game table 20 is accessed and delivered to the pit workstation 580. The pit workstation 580 now has the following information concerning the player requesting the comp request which in the example would be:

| Name: | Bill Smith |
|---|---|
| ID: | 01-505-11-9081 |
| Table: | 04 |
| Position: | P3 |
| Gross Wager: | $1,600 |

Other information may be included in this record, but the non-dealer user reviews this information displayed on a screen for correctness at least with table identification and position number.

The non-dealer user then enters the comp requested by the player into workstation 580:

Comp No. 6 Two theater tickets

Numerous approaches may be used to enter this information into the system 10. One way would be to display a menu to the non-dealer user on a screen such as:

Comp No. 1 (value $20)—Breakfast Coupon for two
Comp No. 2 (value $75)—Dinner Coupon for two
Comp No. 6 (value $135)—Two theater tickets
. . .
Comp No. n (value $700)—Seven-Day Hotel Stay Or the user could simply type a code number in such as "6."

The pit workstation computer 580 then accesses the SQL server 550 in stage 730 to access the player history record (e.g., the information shown in FIG. 8) in the player database record 630. From the player database record 630 at least the following information is retrieved:

| Name: | Bill Smith |
|---|---|
| ID: | 01-505-11-9081 |
| PPP: | $135 | where PPP=Premium Point Balance.

In stage 750, the comp computer (or application) 570 is accessed. In stage 750, comp computer 570 receives the retrieved information obtained from the player database record 630 and along with the current information obtained from the game table computer 90 at the player's table arrives at a current PPP value. In the example being carried through this discussion, the player at the time of making the comp request has a gross wager value of $1,600 in the game session, which when multiplied by the premium point factor of 0.0025 results in $4 which is then added to the retrieved PPP value of $135 to result in a new PPP value of $139. The comp computer 570 determines the new PPP value in stage 770 and compares it to the value of the comp received from the comp database 760. In our example, the player requested theater tickets having a comp value of $135 which is less than $139. In stage 675, computer 570 makes the determination that the comp is available. If no comp were available, a deny report is generated 790. This denial report is delivered to the pit workstation 580 which is then printed and delivered to the player making the request.

However, in the example, a comp is issued, the issuance occurs in stage 690, and a comp is printed by a printer at the workstation 580 which may be the following:

Bill Smith is entitled to two theater tickets valued at $135
Premium points still remaining are $4

With the issuance of the comp in stage 690, the comp server 570 delivers this information to the SQL server 550 which in stage 780 updates the player history record in the player database record 630 by deducting the value of the comp from the value of the PPP and by adding the comp to the comp history which, in the example, would be:

| Name: | Bill Smith |
|---|---|
| ID: | 01-505-11-9081 |
| PPP: | $4 |
| Comp: | Two Theater Tickets |
| Comp Value: | $135 |
| Date and Time Issued: | 3/5/99 at 14:30 |

At this point, and in the example presented, the player receives the issued comp in stage 690 which the player would then redeem and receive the comp. The players historical database is updated in stage 780 by comp computer 570 so that the player history record is current.

While the flow charts discussed above have the comp request occurring during the progress of the game, it is to be entirely understood that it more typically occurs after the game is over. After the game, the player would simply signal a non-dealer user, who would come over and request the player's card 200 and the nature of the comp desired. The non-dealer user accesses the pit workstation 580 or any other suitable computer (such as a change booth, reservation area, etc.) with the player's card 200 and then inputs the necessary information as discussed above except that since the game session is over, the player database record 630 contains the results of the player's last game session and no need exists to access the game table computer 90 at the game table 20.

Whether processing a request for the comp occurs during the play of the game or after a player has ended a gaming session, is immaterial to the teachings of the present invention. The present invention substantially automates the process of comp determination based upon the accurate determination of gross wagers actually made by players. This removes any estimation by non-dealer users in the pit and reduces pit personnel.

In another embodiment resulting in even lower pit personnel, the stand-alone kiosk 595 of FIG. 5 could be provided wherein the player after a gaming session can simply walk up to and access the system 10 by inserting his or her player card 200 so as to determined the availability of a comp. In this case, the player in stage 710 inputs the necessary information. Of course, the player identification information is obtained from the inserted player card 200. However, the kiosk 595 has a video screen which would prompt the player to enter the necessary comp information. The screen would also display the denial report 790 and print the issued comp information 690. By using a kiosk, a player can have more interaction and could select from a number of comps so as to tailor his comp selection to the available PPP.

5. Comp Reports.

FIG. 8 sets forth a form of a report that is produced by report generation computer (or application) 590 shown in FIG. 5 and which could be delivered to and printed by any of the computers on the Internet 500. In most applications, however, the host management system 510 has access to this usually confidential information on a particular player.

In FIG. 8, a screen presentation 800 for viewing on a computer video screen shows a window 810 having a player's name 812, a player's identity 814, and a trip list 816. In trip 817 is a list 818 of gaming sessions played by that player during his trip 817. Each trip has a separate list of gaming sessions.

An administrator at the host management system 510 can use terminal 512 to select which trip to obtain additional information. In FIG. 8, the trip 817 (i.e., Apr. 10, 1998 through Apr. 12 1998) is shown to have session list 818. The information on each gaming session as to type of game and the time played is displayed. In the example shown, game session 822 in game sessions list 818 for trip 817 is Baccarat which occurred Apr. 10, 1998 at 15:33 p.m. Hence, for each game session the game identity and the time of the game session are provided. The administrator can then select a specific session such as session 822 from list 818 and then click on that entry (e.g., 822). Clicking on that entry (e.g., 822) results in a second window 830 which shows player life summary information 840, trip summary information 850 and session summary information 860.

The player life summary information 840 contains data fields showing TRIPS which displays the number of trips (i.e., two trips for this example); HANDS (i.e., how many hands were played during all trips) which in the example is 9,820; and what the HANDLE is (i.e., the accumulated gross wager) which in this example is $245,500 over both trips. BUY-INs of $115,000 over the two trips is also displayed which is not pertinent to the teachings of the present invention, as well as an AVERAGE BET which represents the handle divided by the hands, which in the example is $25. In this example, the accumulated gross wager or HANDLE is $245,500 which at the premium point factor of 0.0025 results in $613.75 total premium points. In the example shown, the COMPS are displayed showing that the player has taken $525 of the premium points leaving a PPP value of $88.75

During the selected trip (e.g., 817), the gross wager or handle for this particular trip 817 is shown to $52,580 with a PPP of $88.75 which corresponds to his present balance in the player life summary 840. The comps taken during this trip 817 are shown in the trip summary 850 and were $125.

Finally, the session summary 860 provides the same information except it provides the starting and ending times for the session 822. It also sets forth the data that ten hands were played resulting in an overall handle of $235. During this gaming session 822, the player made a buy-in of $100 with an average bet of $23.50. The premium points available at the end of this session 822 were 98 premium points and $25 in comps were taken either during the session or after the session.

It is to be expressly understood that other information may appear on screen 800. For example, by clicking on "comps" 841 in the "Player Life Summary" 840 or "comps" 851 in the "Trip Summary" 850 fields, a drop-down window would appear on screen 800 showing the following information:

Comp Value Data Redeemed

Hence, an administrator can rapidly determine all comps taken by the player and generate a report. In addition, by selecting different gaming sessions in the list 818, a session summary 860 for each separate gaming session can be created. Furthermore, by selecting different trips in list 816, the same form of information can be easily displayed. Hence, an administrator typically at the host management system 510 can quickly pull up an individual player 812 and have player life comp 840, trip comp 850, and session comp 860 summaries readily available. This not only provides accurate backup for documentation should the player request, it also becomes an important set of database information, based upon accuracy, or other uses under the teachings of the present invention as will be explained next.

6. Agency Program.

Figure 9:
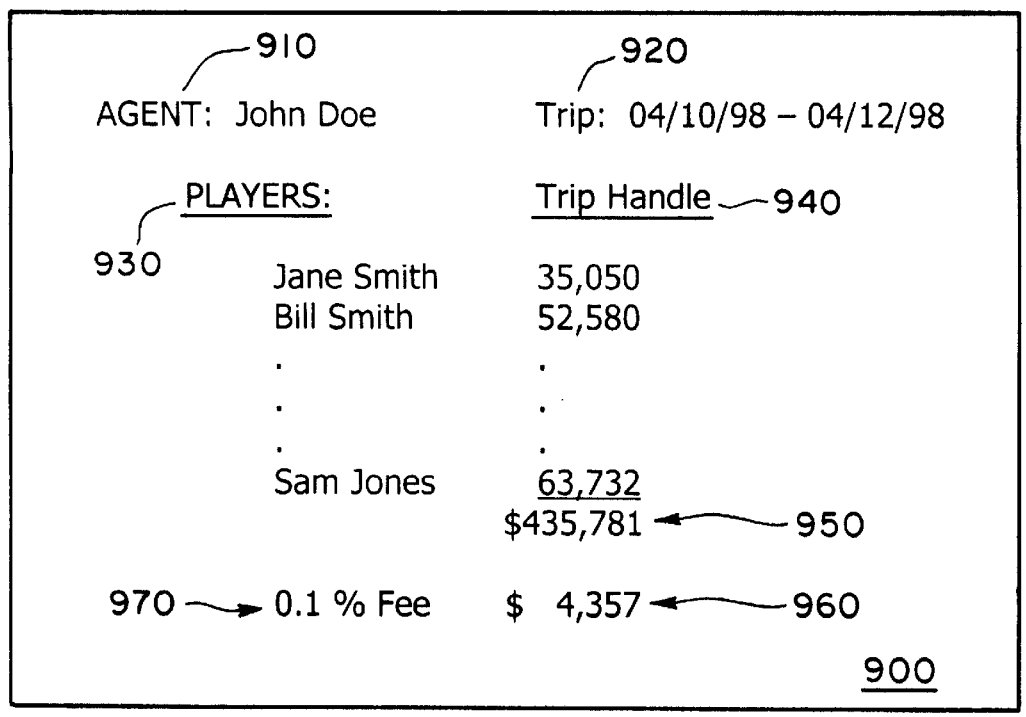
FIG. 9 is a display screen illustration for junket agent compensation.

In FIG. 9, is a screen presentation 900 for a junket agent 910 which, in the example shown, is John Doe. John Doe is the agent responsible for setting up a trip 920 from Apr. 10, 1998 through Apr. 12 1998 for the players listed 930, which includes Jane Smith, Bill Smith, and Sam Jones in our example. Each player in the list has their handle or gross wager displayed in a corresponding trip handle list 940. The total gross wager for the listed players 930 is shown 950 which in the example is $435,781. The agreed fee 970 between John Doe and the casino is 0.1% or $4,357.81 as displayed as an amount 960. The screen presentation or a form similar thereto, can be printed out so that the agent 910, John Doe, has documentation. In addition, backup reports similar to that shown in FIG. 8 showing the trip summary or, if necessary, the session summary for each player in the trip can be provided to the agent 910. The present invention provides accurate measurements of the gross wager for compensation purposes for the junket illustrated in FIG. 9.

7. Direct Mail Program.

The present invention provides a tailored direct mail campaign based upon the information generated by the system 10 of the present invention. Utilizing the system 10 of the present invention, casinos can base direct mail campaigns on a player's lifetime gross wager 1030, gross wager per trip 1040, and/or gross wager per game 1050. Furthermore, based upon the aforesaid gross wager information, casinos can tailor the type of comps to be given to players based upon their gross wager information.

Figure 10:
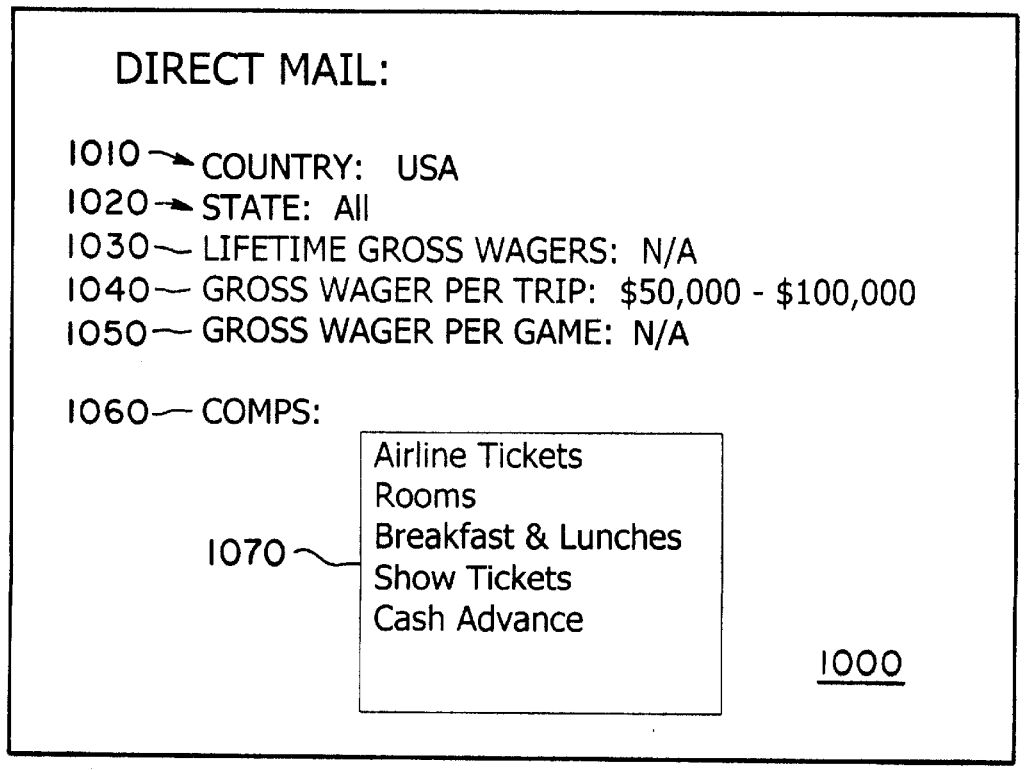
FIG. 10 is a display screen illustration for tailoring a direct mail campaign based on historical gross wager information.

In FIG. 10, is an example of a screen display 1000 under the present invention. Clicking on "COUNTRY" 1010 a selection can be made such as found, but not limited to the following:

ALL
JAPAN
EUROPE
. . .
USA

By simply dicking on one of the above country territory designations, that region will be selected. In FIG. 10, it shows that USA is selected.

Clicking on the "STATE" icon 1020 in FIG. 10, a window appears on screen 1000 such as, but not limited to, the following:

ALL
WEST
MID-WEST
EAST
SOUTH EAST
ALABAMA
. . .
WYOMING

In this case, and as shown in FIG. 10, "ALL" was selected. It is to be understood that the selection of direct mail campaigns based upon the demographic selection of countries and states is well known and is conventional.

The system 10 of the present invention provides selection based upon accurate gross wager information. As shown in FIG. 10, three fields are provided:

LIFETIME GROSS WAGERS 1030
GROSS WAGERS PER TRIP 1040
GROSS WAGER PER GAME 1050

It is to be expressly understood that the direct mail administrator can use one or a combination of these field values to tailor the direct mail campaign to particular players, or any other suitable field values stored in the player database record 630 (e.g., average session wager, etc.).

As shown in the example of FIG. 10, the administrator decided not to base the direct mail campaign on the lifetime gross wagers 1030 (i.e., N/A—not applicable). However, the following would represent a drop-down window of choices should the administrator click on lifetime gross wagers icon 1030:

ALL
$10M
$5M–$10M
$1M–$5M
$500,000–$1M
$100,000–$500,000
<$100,000
N/A

It is to be expressly understood that any suitable monetary ranges could be utilized in the lifetime gross wager selection window set forth above.

The direct mail administrator may also click on the gross wager per trip icon, as shown in FIG. 10, and select from choices in a drop-down window such as set forth in the example below:

ALL
$500,000–$1M
$100,000–$500,000
$50,000–$100,000
$10,000–$50,000
<$10,000
N/A

Again, any suitable selection of range values could be utilized under the teachings of the present invention.

Likewise, the administrator could click on the gross wager per game icon 1050 and have displayed a drop-down window which would show:

ALL
>$500 game
$300–$500
$100–$300
$50–$100
<$50
N/A

In FIG. 10, the administrator clicked on not applicable (N/A).

Finally, the icon for comps 1060 could be clicked on to drop down a window 1070 as shown in FIG. 10 wherein the direct mail administrator may select the comp combinations to be placed in the direct mail campaign information. As shown in FIG. 10, a number of different types of comps are provided. Hence, in the example shown in FIG. 10, where the player has a gross wager per trip in the range of $50,000 to $100,000, the casino administrator may offer comps involving dinners and show tickets. Hence, the direct mail letter or brochure going out to the players throughout the United States having gross wagers per trip in the $50,000 to $100,000 range would receive information stating they would receive the selected comps which, for example, could be one free dinner for two and one set of show tickets for two. On the other hand, if the gross wager per trip was selected to be in the under $10,000 range, comps pertaining to free breakfasts and lunches for two could be provided in the direct mail brochure. For premium players that have a gross wager per trip greater than one million dollars and a lifetime gross wager greater than ten million dollars, the direct mail manager could select comps 1060 which include all of the choices.

8. Threshold Program.

The present invention also provides a thresholding feature, that is, the casino can set an issuance floor, a ceiling, or a combination thereof.

An issuance floor 671A (FIG. 6) is a minimum monetary value that must be wagered to qualify the wager 400 for conversion to premium points. Thus, if the casino has set the issuance floor 671A at $100 per wager, the player must wager $100 or more before computer 90 reports the wager 400 as qualified to earn premium points. Wagers below the issuance floor 671A are not reported by the computer 90 for premium points. For example, in stage 671 (FIG. 6) the computer 90 accesses the issuance floor 671A for comparison with the wager 400 value read in stage 650. If the wager 400 is less than the issuance floor 671A, the computer 90 enters stage 640, returning to the game without updating the player transaction record in stage 620. If the wager 400 is greater than or equal to the issuance floor 671A, the computer 90 returns to stage 620 to update the player transaction record. Alternatively, the computer 90 can enter stage 672 before updating the player transaction record in stage 620 to verify that the input wager is less than the ceiling 672A, as described in more detail below. Similarly, the computer checks the final wager of the session against the issuance floor 671A at stage 670A, after the session is over.

It is to be expressly understood that the casino can use any suitable algorithm for setting an issuance floor 671A, and indeed, the issuance floor 671A can vary among the game tables 20. Likewise, the issuance floor 671A need not apply on a per wager basis and can instead be accumulative over a number of wagers, over an entire game session (e.g., 822) or over an entire trip (e.g., 817). In addition, the step 671 of comparing the wager 400 to the wager floor can be performed at any suitable point, including immediately after the wager 400 is placed. For example, if the issuance floor 671A is accumulative over an entire session, step 671 would not be performed until the session is over (e.g., 670A).

The system 10 and method of the present invention can also be used with cash wagers. Cash wagers include any wager that cannot be automatically determined by computer 90 (e.g., wagers made without chips 300 containing circuitry 310, 320, and 330). A cash identification including at least the cash value corresponding to the cash wager and identity of the player making the cash wager can be input by the dealer using keypad 100. Because data entry errors can occur (e.g., $50.00 entered as $5,000), the casino can set a ceiling 672A that serves as an additional control mechanism. The casino can use any suitable algorithm for determining the value of the ceiling 672A. For example, if the typical wager is under $1,000, the casino may wish to set the ceiling 672A at $1,000. Thus, any data entry on keypad 100 exceeding the ceiling 672A (e.g., $1,000) will require authorization (e.g., an input signal generated when the correct password is entered, or any other suitable means to indicate the wager value has been verified) from a casino official before the computer 90 communicates the wager information to the player database record 630. Thus, the ceiling serves as a gross check on the wagers before premium points are issued to the player. For example, the computer 90 accesses (e.g., from the server 550) the ceiling 672A (FIG. 6) for comparison to the wager 400 in stage 672. If the wager 400 is less than the ceiling 672A, the computer 90 proceeds to update the player transaction record in stage 620. If, however, the wager 400 is greater than the ceiling 672A, the computer 90 waits for an authorization signal in stage 673 before the computer 90 proceeds to update the player transaction record in stage 620.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

I claim:

1. A comp rating system for a player at a game table upon which a live card game is played, said game table having a player position, said game table having a wager area at said player position, said comp rating system comprising:

a player data medium, said player data medium having player identifying data, a reader at said player position, said reader obtaining said player identifying data from said player data medium when said player data medium accesses said reader, a wager having at least one wagering device placed at said wager area, each of said at least one wagering device having value identifying data, a decoder at said game table receiving said value identifying data from said at least one wagering device placed at said wager area, said decoder determining a value of said wager for each live card game played at said game table, a first computer at said game table, said first computer connected to said reader and said decoder, said first computer generating a table record containing said player identifying data, and said wager value for each said live card game, said first computer determining a gross session wager value when said player data medium is removed from said reader, a player database record containing a player history record updated by said first computer, a second computer connected to said player database record, said second computer receiving said table record and said player history record from said player database record upon receiving a comp request, said second computer determining whether said comp request is available, a network including at least said second computer, a host management system, a junket agent compensation request having at least one player identification, said host management system accessing said player history record from said player database record when said player history record matches said at least one player identification in said junket agent compensation request, thereby selecting only said player history record required to compensate a junket agent.

2. A comp rating system at a game table upon which a live card game is played, said game table having a player position and a dealer, said game table having a wager area at said player position, said comp rating system comprising:

a player data medium, said player data medium having player identifying data, a reader at said player position, said reader obtaining said player identifying data from said player data medium when said player data medium accesses said reader, a wager having at least one wagering device placed at said wager area, each of said at least one wagering device having value identiying data, a decoder at said game table receiving said value identifying data from said at least one wagering device placed at said wager area, said decoder determining a value of said wager for each live card game played at said game table, a first computer at said game table, a memory connected to said first computer, said reader and said decoder, said first computer generating a table record in said memory containing said player identifying data, and said wager value for each said live card game, said first computer determining a gross session wager value when said player data medium is removed from said reader, a player database record located remote from said table, said player database record containing a player history record, said player history record having an accumulative gross wager, a premium point factor, a premium point balance, and a plurality of comp values, a network, at least a second computer connected to said first computer over said network and to said player database record, said second computer receiving said table record and said player history record from said player database record upon receiving a comp request, said second computer determining whether said comp request is available, a host management system connected over said network, a junket agent compensation request having at least one player identification, said host management system accessing said player history record from said player database record when said player history record matches said at least one player identification in said junket agent compensation request, thereby selecting only said player history record required to compensate a junket agent.

3. A comp rating system at a game table upon which a live card game is played, said game table having a player position and a dealer, said game table having a wager area at said player position, said comp rating system comprising:

a player data medium, said player data medium having player identifying data, a reader at said player position, said reader obtaining said player identifying data from said player data medium when said player data medium accesses said reader, a wager having value identifying data, said wager selected from the group consisting of:
a) at least one wagering device placed at said wager area, and
b) a cash wager, a wager input device at said game table to receive said value identifying data for said wager for each live card game played at said game table based on said value identfying data, a memory at said game table, a first computer connected to said memory, said reader, said wager input device, said first computer generating a table record in said memory only after receiving an authorization signal when said wager value exceeds a predetermined ceiling, said table record containing said player identifying data, said wager value, said player position and a time for each said live card game, said first computer determining a gross session wager value when said player data medium is removed from said reader, a player database record located remote from said table, said player database record containing a player history record, said player history record having an accumulative gross wager, a premium point factor, a premium point balance, and a plurality of comp values, a network having at least a second computer connected to said first computer, and to said player database record, said second computer receiving said table record and said player history record from said player database record upon receiving a comp request, said second computer determining whether said comp request is available, a host management system connected over said network, a junket agent compensation request having at least one player identification, said junket agent compensation request input into said host management system, said host management system accessing said player history record from said player database record when said player history record matches said player identification in said junket agent compensation request, thereby selecting only said player history record required to compensate a junket agent.

4. A comp rating method at a game table upon which a live card game is played, the game table having a player position and a dealer, the game table having a wager area at the player position, the comp rating method comprising the steps of:

providing player identifying data in a reader, determining the value of a wager at the table for each live card game played, generating a table record containing the player identifying data from the reader and the wager value for each said live card game, tabulating in a computer a gross session wager value, updating a player history record in a player database record to generate at least a premium point balance, inputting a comp request from the player during the live card game, obtaining a comp value corresponding to the inputted comp request from a comp database including the gross session wager value at the time of the inputted comp request, awarding the inputted comp request to the player when the obtained comp value is equal to or less than the premium point balance and updating the premium point balance by deducting the value of the awarded comp, denying the comp request to the player when the comp value is greater than the premium point balance.

5. The method of claim 4 wherein the step of providing player identifying data is through a player data medium.

6. The method of claim 5 further comprising the step of obtaining in the reader at said player position the player identifying data from the player data medium when the player data medium accesses the reader.

7. The method of claim 4 wherein the step of determining the value of the wager further includes reading at least one wagering device placed at said wager area of said game table, each of said at least one wagering device having value identifying data.

8. The method of claim 4 wherein the step of determining the value of the wager further includes inputting a cash value at a dealer keypad corresponding to a cash wager.

9. The method of claim 8 wherein the step of updating said player history record to generate at least said premium point balance is updated only after receiving an authorization signal when said cash value corresponding to said cash wager exceeds a predetermined ceiling.

10. The method of claim 4 wherein the step of updating said player history record to generate at least said premium point balance is updated only if said wager exceeds an issuance floor value.

11. The method of claim 4, further comprising the steps of:
   receiving in a host management system at least one field value selected from a plurality of field values resident in a host management system,
   obtaining at least one comp combination selected from a plurality of comp combinations resident in said host management system,
   accessing said player identifying data from said player database record when said player history record matches said at least one field value,
   tailoring a direct mail campaign corresponding to said selected field value.

12. A comp rating method at a game table upon which a live card game is played, the game table having a player position and a dealer, the game table having a wager area at the player position, the comp rating method comprising the steps of:
   providing player identifying data in a reader,
   determining the value of a wager for each live card game played at the table,
   generating a table record containing the player identifying data from the reader and the wager value for each said live card game,
   tabulating in a computer a gross session wager value,
   updating a player history record in a player database record to generate at least a premium point balance,
   inputting a comp request,
   obtaining a comp value corresponding to the inputted comp request from a comp database,
   awarding the inputted comp request when the obtained comp value is equal to or less than the premium point balance and updating the premium point balance by deducting the value of the awarded comp,
   denying the comp request when the comp value is greater than the premium point balance,
   receiving a junket agent compensation request in a host management system, said junket agent compensation request having at least one player identification,
   accessing said player history record from said player database record when said player history record matches said at least one player identification in said junket agent compensation request,
   compensating a junket agent based on said accessed player history record.

13. A comp rating method at a game table upon which a live card game is played, said game table having a player position and a dealer, said game table having a wager area at said player position said comp rating method comprising the steps of:
   receiving in a reader at said player position player identifying data from a player data medium when the player data medium accesses the reader,
   accepting a wager having at least one wagering device placed at said wager area of said game table, each of said at least one wagering device having value identifying data,
   automatically determining the value of the wager at the table for each live card game played based on said value identifying data,
   generating a table record containing said player identifying data and said wager value for each said live card game,
   tabulating a gross session wager value when the player data medium is removed from said reader,
   updating a player history record in a player database record to generate at least a premium point balance,
   receiving a comp request from the player during the live card game,
   obtaining a comp value corresponding to said comp request from a comp database including the gross session wager value at the time of the comp request,
   awarding the requested comp to the player when the comp value is equal to or less than the premium point balance and updating the premium point balance by deducting the value of the awarded comp,
   denying the comp request to the player when the comp value is greater than the premium point balance.

14. The method of claim 13 wherein the step of determining the value of the wager further includes receiving a cash value at a dealer keypad corresponding to a cash wager.

15. The method of claim 14 wherein the step of updating said player history record to generate at least said premium point balance is updated only after receiving an authorization signal when said cash value corresponding to said cash wager exceeds a predetermined ceiling.

16. The method of claim 13 wherein the step of updating said player history record to generate at least said premium point balance is updated only if said wager exceeds an issuance floor value.

17. The method of claim 13, further comprising the steps of:
   receiving in a host management system at least one field value selected from a plurality of field values resident in a host management system,
   obtaining at least one comp combination selected from a plurality of comp combinations resident in said host management system,
   accessing said player identifying data from said player database record when said player history record matches said at least one field value,
   tailoring a direct mail campaign corresponding to said selected field value.

18. A comp rating method at a game table upon which a live card game is played, said game table having a player position and a dealer, said game table having a wager area at said player position, said comp rating method comprising the steps of:
   receiving in a reader at said player position player identifying data from a player data medium when the player data medium accesses the reader,
   accepting a wager having at least one wagering device placed at said wager area of said game table, each of said at least one wagering device having value identifying data,
   automatically determining the value of the wager for each live card game played at the table based on said value identifing data,
   generating a table record containing said player identifying data and said wager value for each said live card game, tabulating a gross session wager value when the player data medium is removed from said reader, updating a player history record in a player database record to generate at least a premium point balance, receiving a comp request, obtaining a comp value corresponding to said comp request from a comp database, awarding the requested comp when the comp value is equal to or less than the premium point balance and updating the premium point balance by deducting the value of the awarded comp, denying the comp request when the comp value is greater than the premium point balance, receiving a junket agent compensation request in a host management system, said junket agent compensation request having at least one player identification, accessing said player history record from said player database record when said player history record matches said at least one player identification in said junket agent compensation request, compensating a junket agent based only on said accessed player history record.

19. A comp rating method at a game table upon which a live card game is played, said game table having a player position and a dealer, said game table having a wager area at said player position, said comp rating method comprising the steps of:

obtaining in a reader at said player position player identifying data from a player data medium when the player data medium accesses the reader, accepting a wager having value identifying data, said wager selected from the group consisting of:
a) at least one wagering device placed at s aid wager area of said game table, and
b) a cash wager, determining the value of the wager at the table for each live card game played based on said value identifying data, generating a table record containing said player identifying data and said value of the wager for each said live card game, tabulating a gross session wager value when the player data medium is removed from said reader, updating a player history record in a player database record to generate at least a premium point balance only if said wager exceeds an issuance floor value and only after receiving an authorization signal when said wager value exceeds a predetermined ceiling, receiving a comp request from the player during the live card game, obtaining a comp value corresponding to said comp request from a comp database including the gross session wager value at the time of the comp request, awarding the requested comp to the player if the comp value is equal to or less than the premium point balance and updating the premium point balance by deducting the value of the awarded comp, denying the comp request to the player if the comp value is greater than the premium point balance.

20. The method of 19, further comprising the steps of:

receiving in a host management system at least one field value selected from a plurality of field values resident in a host management system, obtaining at least one comp combination selected from a plurality of comp combinations resident in said host management system, accessing said player identifying data from said player database record when said player history record matches said at least one field value, tailoring a direct mail campaign based said accessed player history record.

21. A comp rating method at a game table upon which a live card game is played, said game table having a player position and a dealer, said game table having a wager area at said player position, said comp rating method comprising the steps of:

obtaining in a reader at said player position player identifying data from a player data medium when the player data medium accesses the reader, accepting a wager having value identifying data, said wager selected from the group consisting of:
a) at least one wagering device placed at said wager area of said game table, and
b) a cash wager, determining the value of the wager for each live card game played at the table based on said value identifying data, generating a table record containing said player identifying data and said value of the wager for each said live card game, tabulating a gross session wager value when the player data medium is removed from said reader, updating a player history record in a player database record to generate at least a premium point balance only if said wager exceeds an issuance floor value and only after receiving an authorization signal when said wager value exceeds a predetermined ceiling, receiving a comp request, obtaining a comp value corresponding to said comp request from a comp database, awarding the requested comp if the comp value is equal to or less than the premium point balance and updating the premium point balance by deducting the value of the awarded comp, denying the comp request if the comp value is greater than the premium point balance, receiving a junket agent compensation request in a host management system, said junket agent compensation request having at least one player identification, accessing said player history record from said player database record when said player history record matches said at least one player identification in said junket agent compensation request, compensating a junket agent based on said accessed player history record.

22. A method of compensating a junket agent, the method comprising the steps of:

receiving in a host management system a junket agent compensation request, said junket agent compensation request having at least one player identification, accessing a player database for at least one player identification, selecting each player history record in the player database that matches the at least one player identification in said junket agent compensation request, compensating said junket agent based on said selected player history records.

* * * * *